(12) United States Patent
Kaehler (10) Patent No.: US 8,331,682 B2
(45) Date of Patent: Dec. 11, 2012

(54) SYSTEM AND METHOD FOR SINGLE STROKE CHARACTER RECOGNITION

(75) Inventor: Adrian Kaehler, Boulder Creek, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1141 days.

(21) Appl. No.: 12/199,609

(22) Filed: Aug. 27, 2008

(65) Prior Publication Data

US 2010/0054602 A1    Mar. 4, 2010

(51) Int. Cl.
*G06K 9/00* (2006.01)

(52) U.S. Cl. ........................................................ 382/189

(58) Field of Classification Search .................. None
See application file for complete search history.

(56) References Cited

U.S. PATENT DOCUMENTS

| 4,975,975 | A |   | 12/1990 | Filipski |
| 5,392,364 | A |   | 2/1995  | Yokoyama et al. |
| 5,550,931 | A | * | 8/1996  | Bellegarda et al. ............ 382/187 |
| 5,596,656 | A | * | 1/1997  | Goldberg ........................ 382/186 |
| 5,684,892 | A |   | 11/1997 | Taguchi |
| 5,757,959 | A | * | 5/1998  | Lopresti ......................... 382/186 |
| 6,636,631 | B2 |  | 10/2003 | Miyazaki et al. |
| 7,013,046 | B2 |  | 3/2006  | Kawamura et al. |
| 2005/0190973 | A1 | | 9/2005 | Kristensson et al. |
| 2010/0050133 | A1 | * | 2/2010 | Nishihara et al. ............. 715/863 |

* cited by examiner

*Primary Examiner* — Claire X Wang (74) *Attorney, Agent, or Firm* — Tarolli, Sundheim, Covell & Tummino LLP (57) ABSTRACT

Systems and methods are provided for recognizing a single stroke gesture. An input trajectory representing the single stroke gesture is received. The input trajectory is normalized to produce a normalized trajectory having a standard set of dimensions. The normalized trajectory is reduced to a standard number of substantially evenly spaced points. Respective covariance adjusted distances are determined for each class as the covariance adjusted position between a set of points representing each single stroke character classes and the substantially evenly spaced points representing the normalized trajectory.

20 Claims, 4 Drawing Sheets

SYSTEM AND METHOD FOR SINGLE STROKE CHARACTER RECOGNITION

TECHNICAL FIELD

The present invention relates to handwriting recognition systems and, more particularly, to systems and methods for single stroke character recognition.

BACKGROUND OF THE INVENTION

The widespread adoption of portable electronic devices, such as portable digital assistants (PDAs), has led to the development of novel user interfaces facilitating the entry of data and commands. Many such devices allow a user to enter alphanumeric data and pictorial commands directly on the display area of the device using a stylus. Such an approach necessitates efficient and reliable identification among a plurality of alphanumeric characters and pictorial commands available to be written and drawn by the user, referred to as an alphabet. One popular alphabet of pictorial commands is that utilized by the Graffiti system developed by Palm, Inc. The Graffiti alphabet comprises a set of single stroke, gestures, where a stroke is defined as a stylus trajectory between "stylus-down" and "stylus-up" events detected on the touch sensitive display area. Each single stroke gesture corresponds to one among a set of recognized alphanumeric characters, symbols (e.g. punctuation, simple arithmetic signs, asterisks, and similar symbols), accents (e.g. â and ä), and functions (e.g. TAB and RETURN). The Unistroke alphabet, developed by Xerox, is another example of a single stroke alphabet used for character recognition.

SUMMARY OF THE INVENTION

In accordance with one aspect of the present invention, a computer readable medium stores executable instructions for recognizing a single stroke character. A gesture input interface is configured to convert input from a user into a trajectory representing a single stroke character. A normalization component is configured to resample the trajectory to produce a resampled trajectory having a standard size. A reference point generator is configured to define a standard number of substantially equidistant reference points on the resampled trajectory. Each of the reference points has at least two associated coordinates. A plurality of class templates each represent an associated single stroke character class and include, for each of a set of points corresponding to the standard number of points, a mean value for each of at least two coordinates corresponding to the at least two coordinates associated with the reference points, a variance value for each of the at least two coordinates, and a covariance between a first coordinate and a second coordinate of the at least two coordinates. A covariance adjusted distance component is configured to determine respective covariance adjusted distances between the mean values for the at least two coordinates of the set of points associated with each of the plurality of class templates and the reference points on the resampled trajectory.

In accordance with another aspect of the present invention, a method is provided for recognizing a single stroke gesture. An input trajectory representing the single stroke gesture is received. The input trajectory is normalized to produce a normalized trajectory having a standard set of dimensions. The normalized trajectory is reduced to a standard number of substantially evenly spaced points. Respective covariance adjusted distances are determined for each class as the covariance adjusted position between a set of points representing each single stroke character classes and the substantially evenly spaced points representing the normalized trajectory.

In accordance with yet another aspect of the present invention, a single stroke character recognition system is provided. An input device is configured to convert a movement by either a portion of a user's body or object held by the user into a trajectory representing a single stroke character. A normalization component is configured to resample the trajectory to produce a resampled trajectory having a standard size. A reference point generator is configured to define a standard number of substantially equidistant reference points on the resampled trajectory. Each of the substantially equal points has at least two associated coordinates. A plurality of class templates each represent an associated single stroke character class and include representative statistics for at least two coordinate values for each of a set of points corresponding to the standard number of points. A covariance adjusted distance component is configured to determine respective covariance adjusted distances between the set of points associated with each of the plurality of class templates and the reference points on the resampled trajectory.

DETAILED DESCRIPTION OF INVENTION

The present invention relates to systems and methods for classifying a gesture from a user into an alphabet of single stroke characters. In accordance with an aspect of the present invention, an input from a user can be reduced to a number of representative points, and the points can be compared to a plurality of class templates. To quantify the difference between the representative points and the class templates, a covariance adjusted distance measurement, such as the Mahalanobis distance can be used, and a class having the smallest distance below a rejection threshold can be selected. By utilizing a covariance weighted distance measure, it is possible to distort the feature space defining each point, allowing for superior discrimination among the various characters. Specifically, the use of the covariance weighted distance allows for variations between successive performances by a single user to be quantified as to improve the robustness of the identification process.

Figure 1:
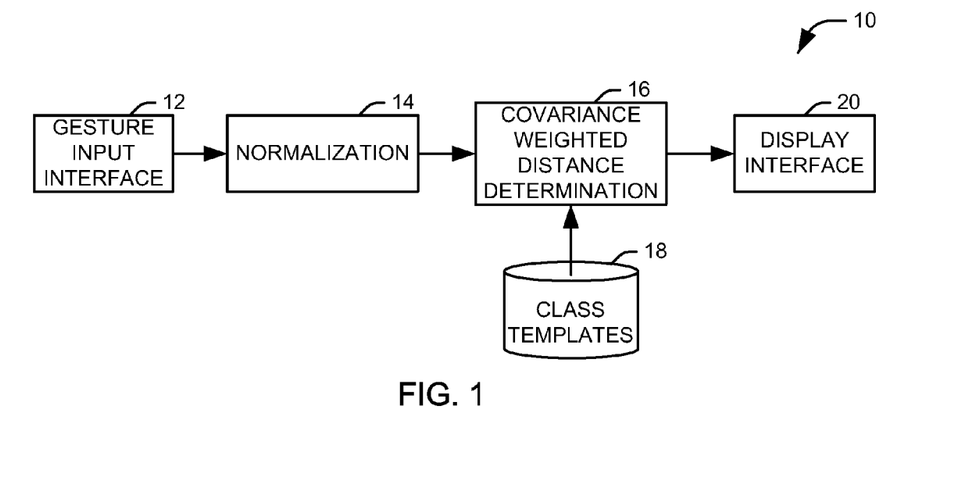
FIG. 1 illustrates a single stroke gesture recognition system in accordance with an aspect of the present invention.

FIG. 1 illustrates a single stroke gesture recognition system 10 in accordance with an aspect of the present invention. It will be appreciated that by "single stroke gesture," it is meant to include any movement by a limb, digit, or tool (e.g., a stylus) of a user that is measured from a designated starting point (e.g., the point in which a stylus is placed on the screen, the point at which a digit is inserted into a region monitored by infrared cameras, etc.), to a designated ending point. The system 10 includes a gesture input interface 12 that reduces a gesture made by a user into a trajectory defined by a continuous line of points. For example, the gesture input interface 12 can include a touch screen and appropriate software for tracking the position of a stylus on the touch screen. Alternatively, the gesture input interface 12 can include an arrangement of one or more cameras operating in the visible or infrared spectra that track the movement of a user within a designated region. In another implementation, the gesture input device 12 could include a mouse or a similar device, with a click of the mouse indicating the designated starting and ending points.

The trajectory produced by the gesture input interface 12 is provided to a normalization component 14. The normalization component 14 is configured to resample the points comprising the trajectory to a standard set of dimensions. For example, the points comprising the trajectory can be resampled via a linear transformation to fit a unit square of standard size. A bounding box can be defined, such that each of a topmost point, a lowermost point, a leftmost point, and a rightmost point in the resampled trajectory is within a predetermined distance of a corresponding boundary of the bounding box, and the contents of the bounding box can be resampled to fit the unit square. During this resampling process, the original points can be replaced with a standard number of reference points at even intervals along the normalized trajectory. Each of these points has an associated first coordinate and a second coordinate within the unit square, for example, a horizontal and a vertical coordinate. Accordingly, the resampled trajectory can be reduced to n evenly spaced points defined by 2n coordinates, and a given trajectory can be conceptualized as a point in a 2n-dimensional space. The similarity and difference of various trajectories can be quantified as the distance between the points in the defined 2n-dimensional space.

In developing a system in accordance with an aspect of the present invention, it has been determined that a significant degree of correlation can exist between various pairs of the 2n coordinates representing the points for various single stroke characters. It will be appreciated that the horizontal and vertical coordinates of a given point in a trajectory can show an especially high degree of dependence. Accordingly, the assumption of independence between the coordinates, which is substantially accurate in most recognition tasks, does not necessarily hold true for the various coordinates defining the resampled trajectory. In accordance with an aspect of the present invention, the dependence among the coordinates can be accounted for by including at least one covariance term into the distance calculation to account for the impact of the correlated coordinates. The effect of this covariance term can be conceptualized as a stretching or distortion of the 2n-dimensional space to account for relatedness of the parameters representing the 2n-dimensional space.

To this end, the resampled trajectory is provided to a covariance adjusted distance component 16. By a "covariance adjusted distance component," it is meant to encompass any tangible component, such as a programmable logic device, a hardwired digital logic circuit, or a set of computer executable instructions encoded in a computer readable medium, that is configured to calculate a distance between two points in a multidimensional space defined by a plurality of parameters, that includes at least one term representing the covariance between a first parameter and a second parameter. One example of such a component is a set of computer executable instructions stored on a computer readable medium and configured to calculate a Mahalanobis distance between two points.

The covariance weighted distance component 16 compares the points comprising the resampled trajectory to each of a plurality of class templates 18, each representing an associated single stroke character class and comprising the standard number (2n) of points. The plurality of class templates are developed during a training process with a user, in which a plurality of reference strokes for each class are received and normalized to respective sets of representative points. Representative statistics for a given class can be calculated for each coordinate and between at least one pair of coordinates, such as a mean and variance for each coordinate, and covariances between one or more pairs of coordinates. A distance value for each class is computed according to the difference in positions between the points comprising the class template associated with the class and corresponding points in the resampled trajectory. For example, a covariance adjusted distance can be determined for each class between each point on the template and the corresponding point on the resampled trajectory. A linear combination of the distances can then be used as a total distance for the class. Alternatively, for each class, a Mahalanobis distance can be determined between a point in 2n-dimensional space representing the class template and a point representing the resampled trajectory. A class having the smallest associated distance value can be selected and displayed to the user via a display interface 20. In one implementation, a null class can also be selected when the smallest associated distance value is greater than a threshold value.

Figure 2:
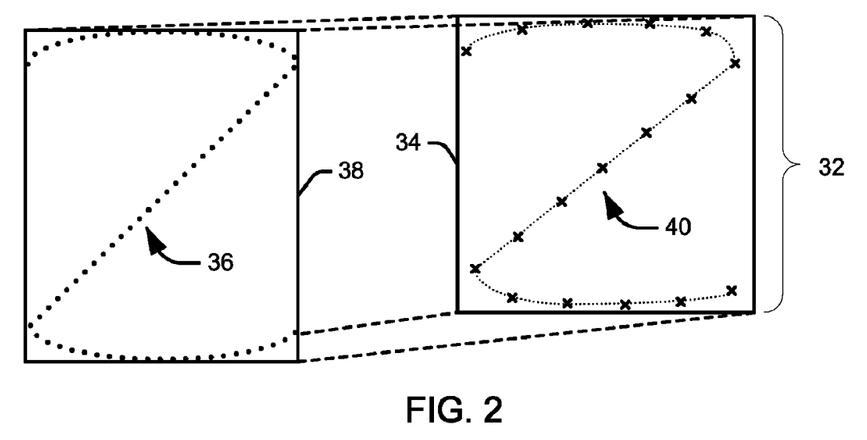
FIG. 2 illustrates graphically the normalization process for producing set of reference points within a unit square from a single stroke character trajectory.

FIG. 2 illustrates the normalization process for producing set of reference points 32 within a unit square 34 from a single stroke character trajectory 36. After the single stroke character trajectory 36 is acquired, a bounding box 38 can be defined around the character to define the horizontal and vertical extents of the character. The contents of bounding box 38 are mapped via a linear transformation to the unit square 34 to produce a normalized trajectory 40 having standard dimensions. The set of reference points 32 are assigned along the normalized trajectory 40 such that adjacent reference points are separated by a substantially equal length of the normalized trajectory to provide a representative sampling along the length of the normalized trajectory. It will be appreciated that each reference point will have associated horizontal and vertical coordinates within the unit square 34, and can thus be readily compared to a corresponding reference point on second normalized trajectory (not shown) to quantify the similarity of the normalized trajectory 40 to the second normalized trajectory.

Figure 3:
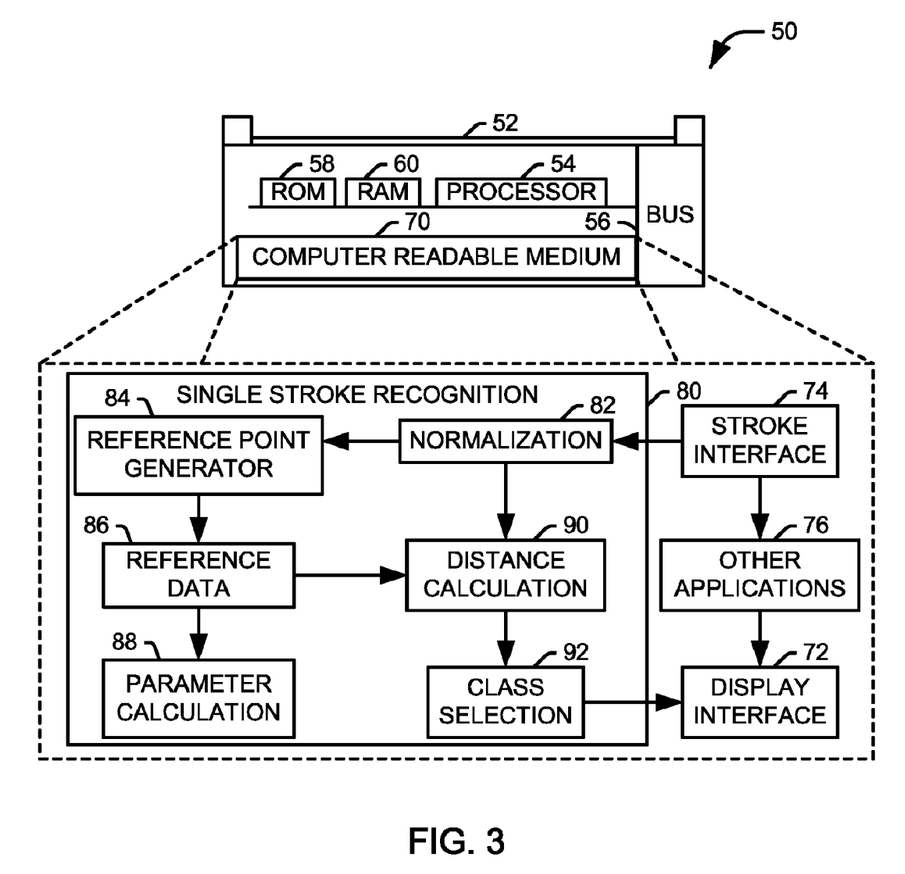
FIG. 3 illustrates an exemplary implementation of a personal digital assistant (PDA) utilizing a single stroke character recognition system in accordance with an aspect of the present invention.

FIG. 3 illustrates an exemplary implementation of a personal digital assistant (PDA) 50 utilizing a single stroke character recognition system 80 in accordance with an aspect of the present invention. The PDA 50 includes a touch screen display 52 that is operative to display data to a user and to allow the user too data into the device, for example, with the user's finger or via a handheld stylus. The touch screen display 52 is connected to at least one processor 54 of the PDA 50 via a system bus 56 that carries data among the various components of the PDA. The processor 54 can be operatively connected to a read only memory (ROM) 58 and a random access memory (RAM) 60 that serves as a working memory for the processor. A basic input/output system (BIOS) can reside in the ROM 58, generally containing the basic routines that help to transfer information between elements within the PDA 50, for example, during a reset or power-up.

The processor 54 can be configured to execute computer executable instructions stored in an associated computer readable medium 70. The computer readable medium 70 can include various sets of executable instructions that are illustrated and described as functional blocks to facilitate description. The computer readable medium can include an appropriate display interface 72 for communicating stored data to a user at the touch screen display 52. A stroke input interface 74 allows for trajectory information provided by the user to be converted to a series of coordinate points that can be interpreted by the PDA to discern the user's intent. For example, a given stroke is defined by a sequence of points beginning with a point at which the stylus is first detected as contacting the touch sensitive surface and ending with the point at which the stylus is last detected as contacting the touch screen. The intermediary points define a piecewise linear stroke trajectory. The number and spacing of the points are determined by the sampling rate of the touch screen. The computer readable medium 70 can also comprise various other software applications 76 that can be executed by the PDA.

The computer readable medium 70 can further comprise a single stroke character recognition system 80 in accordance with an aspect of the present invention. The single stroke character recognition system 80 can comprise a normalization element 82 that applies a linear combination to the sequence of points to minimize the effects of variations in scale and aspect. Specifically, a series of points representing a trajectory input by a user can be mapped from an associated bounding box of the stroke to a standard unit square, such that the user provided trajectory is expanded or contracted in each dimension to a standard size. A reference point generator 84 defines a plurality of reference points to represent the mapped trajectory. Specifically, the plurality of points defining the trajectory, which are generally unevenly spaced along the trajectory due to variations in the user stylus speed and the sampling rate of the touch screen, are replaced by a sequence of reference points that are substantially evenly spaced along the trajectory. For example, the reference points can be assigned by determining a total length of the stroke, dividing the total length by a value one greater than the desired number of reference points to provide a segment length, and assigning the reference points as to divide the stroke into a plurality of segments that each have a length approximately equal to the segment length. Each reference point can be defined as a horizontal coordinate and a vertical coordinate within the unit square.

During training, a user can enter a series of strokes of a given class of single stroke characters. The reference point generator 84 can calculate a set of reference points for each of the series of strokes and store the sets of reference points as reference data 86 for their associated class. This reference data 86 can be provided to a parameter calculation component 88 that calculates representative statistics across the plurality of strokes comprising the reference data for each class. Accordingly, for each reference point in each class, there are a plurality of coordinate pairs available from the plurality of strokes for that class. From this data, a mean and variance of the horizontal and vertical coordinates of each reference point within a class, as well as a covariance between the horizontal and vertical coordinates, can be determined.

During operation, an acquired stroke is input by a user and reduced to a plurality of reference points as described above. At a distance calculation component 90, the plurality of reference points defining the acquired stroke is compared with each of a set of corresponding predefined reference points representing various character classes. Each set of predefined reference points represents a piecewise linear trajectory within the unit square. A covariance adjusted distance value is calculated for each class, representing the aggregate difference in position between each of the points comprising the plurality of reference points defining the acquired stroke and a corresponding reference point associated with the class, adjusted for a covariance between the coordinate values for each point. In one implementation, the covariance adjusted distance can be calculated as:

$$D_j^2 = \sum_{i=1}^{m} (\vec{p}_i - \vec{r}_{i,j})^T \Sigma_{i,j}^{-1} (\vec{p}_i - \vec{r}_{i,j})$$ Eq. 1 where $D_j$ is the distance value for a class, j, $\vec{p}_i$ is a two-dimensional vector representing the position of an $i^{th}$ reference point of m reference points defining the acquired stroke, $\vec{r}_{i,j}$ is a two-dimensional vector representing the position of the $i^{th}$ reference point of m reference points representing the class, j, and $\Sigma_{i,j}^{-1}$ is the inverse of the covariance matrix between the horizontal and vertical coordinates of the $i^{th}$ point in the training data for class j.

The calculated distance values can be then be provided to a class selection component 92 that selects an appropriate class according to the calculated covariance distance values. In some implementations, the class selection component 92 can simply select the class having the smallest covariance weighted distance. In the illustrated implementation, the class selection component 92 also includes a rejection component, such that when the smallest covariance weighted distance is larger than a threshold value, a null class is selected. It will be appreciated that the threshold distance can vary with the selected class. In other implementations, additional data can be utilized to influence the class selection process. For example, the acquired distance values can be weighted according to the context of other identified characters, such that characters that would continue or complete a word in an associated dictionary (not shown) are favored. Once a character class is selected, the selected character can be provided to the display interface 72 to be displayed to the user at the touch screen 52.

Figure 4:
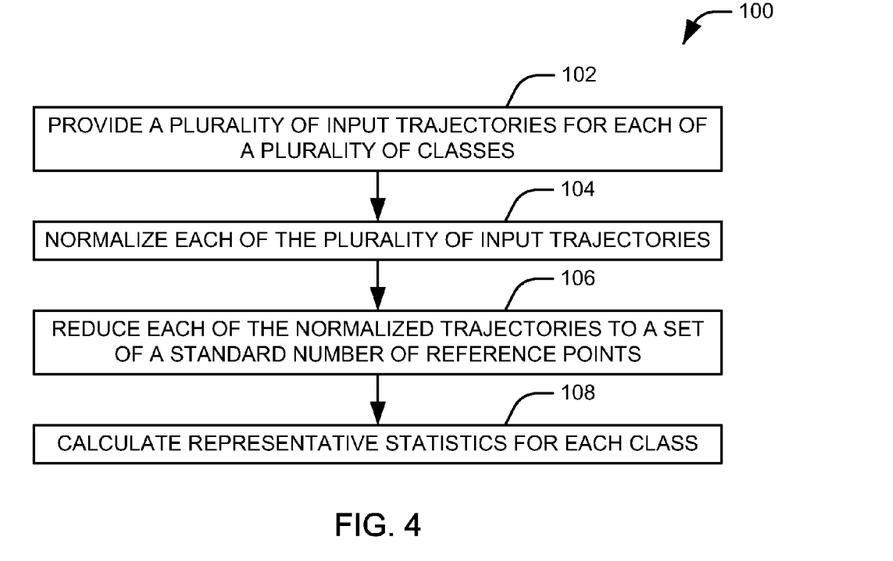
FIG. 4 illustrates an exemplary methodology for training a single stroke recognition system in accordance with an aspect of the present invention.
Figure 5:
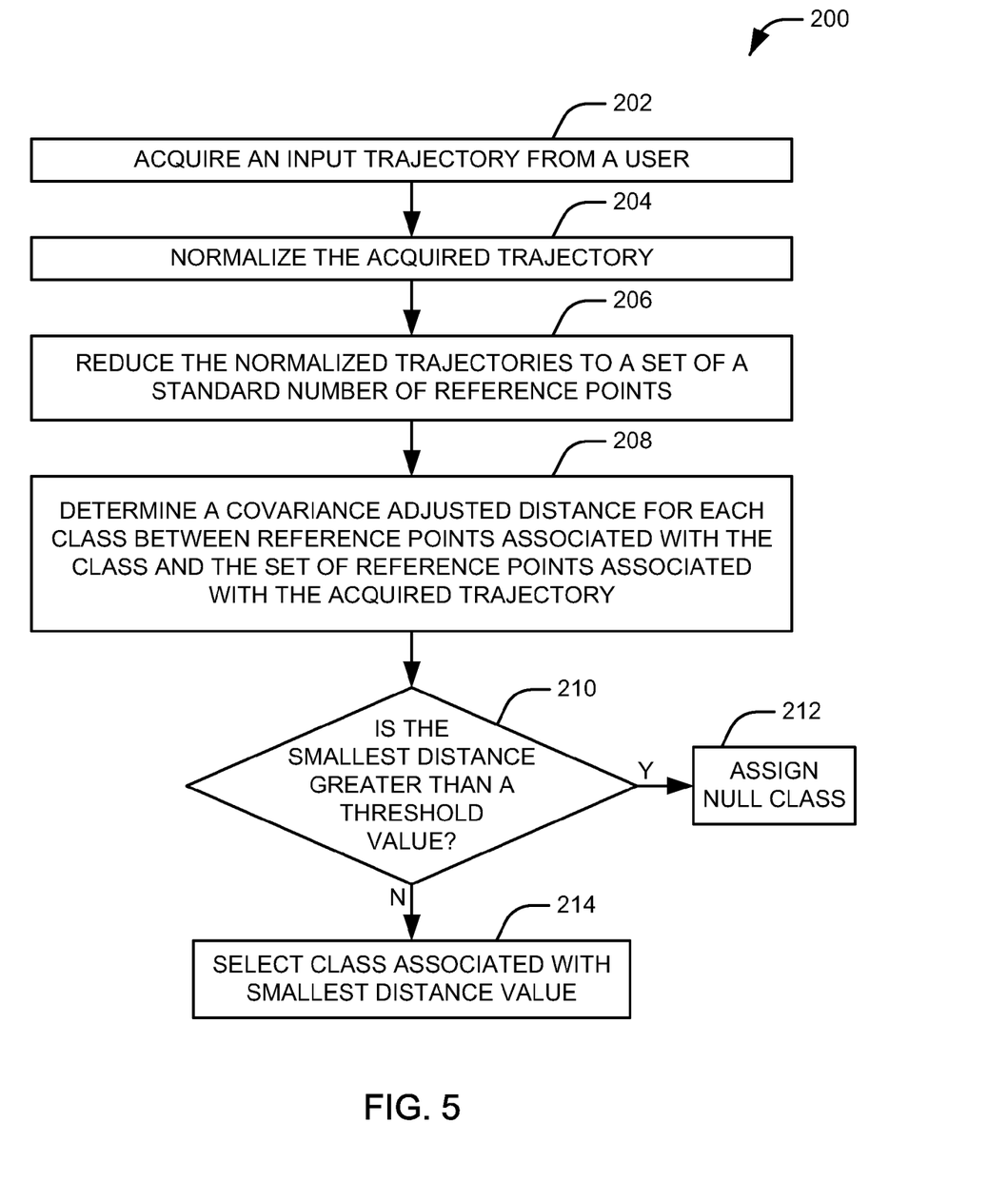
FIG. 5 illustrates a methodology for recognizing a single stroke gesture in accordance with an aspect of the present invention.

In view of the foregoing structural and functional features described above, methodologies in accordance with various aspects of the present invention will be better appreciated with reference to FIGS. 4 and 5. While, for purposes of simplicity of explanation, the methodologies of FIGS. 4 and 5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 4 illustrates an exemplary methodology 100 for training a single stroke recognition system in accordance with an aspect of the present invention. At 102, a plurality of input trajectories are acquired for each of a plurality of single stroke characters to be identified during subsequent operation. At 104, each of the acquired input trajectories is normalized to a standard set of dimensions. In one implementation, a bounding box is defined around each trajectory, and the contents of the bounding box can be mapped to the unit square via a linear transformation. Each of the normalized characters can be reduced to a set of standard number of reference points at 106. The reference points are selected to divide the normalized character into a plurality of segments of even length, such that the reference points are evenly spaced along the normalized trajectory. Accordingly, within each class, each of the plurality of trajectories should be represented by corresponding reference points in substantially similar positions on the trajectory.

At 108, representative statistics for each class can be calculated. For example, the data for each class can include multiple coordinate values for each of the reference points from the plurality of acquired trajectories for the class. From this data, a mean horizontal coordinate and a mean vertical coordinate can be calculated for each of the plurality of reference points across the plurality of acquired trajectories for the class. Similarly, a variance of the horizontal and vertical coordinates for a given reference point can be calculated across the plurality of acquired trajectories, and a covariance of the horizontal and vertical coordinates for each point can be determined.

From the means, variances, and covariance term, a covariance matrix and a distribution within the unit square of each reference point for a given class can be determined. This distribution can be represented as an ellipse having a centroid at the mean horizontal coordinate and the mean vertical coordinate, and an ellipse with a first axis of length equal to twice the variance of the horizontal coordinate and a second axis of twice the variance of the vertical coordinate. Where the covariance of the horizontal and vertical coordinates is zero, the ellipse representing the distribution will be oriented such that the first axis is horizontal and the second axis is vertical. Where the covariance is non-zero, the ellipse will be inclined, such that the axes of the ellipse are at an oblique angle relative to the axes defining the unit square. It will be appreciated that the respective covariance matrices and distributions associated with the plurality of reference points will vary within a given class. For example, for some characters, it has been determined that the variance across strokes increases towards the end of the stroke, particularly in the horizontal direction. By incorporating these tendencies into the analysis, it is possible to reliably account for the uncertainty that should be expected between multiple performances of a particular stroke.

FIG. 5 illustrates a methodology 200 for recognizing a single stroke gesture in accordance with an aspect of the present invention. At 202, an input trajectory representing one of a plurality of character classes is received from a user. For example, the trajectory can be received by tracking a stylus on a touch screen or track the movement of a user within a designated region, and reduced into a continuous line of points defining the input trajectory. At 204, the input trajectory is normalized to a standard set of dimensions. For example, the points comprising the trajectory can be enclosed by a bounding box, and the contents of the bounding box can be resampled via a linear transformation to fit a unit square of standard size.

At 206, the normalized trajectory is reduced to a standard number of substantially evenly spaced points. Each of these points has an associated first coordinate and a second coordinate within the bounding box, for example, a horizontal and a vertical coordinate. Accordingly, the resampled trajectory can be reduced to n evenly spaced points defined by 2n coordinates, and a given trajectory can be conceptualized as a point in a 2n-dimensional space. At 208, respective covariance adjusted distances can be determined between the reference points associated with the normalized trajectory and a plurality of sets of reference points, each representing an associated single stroke character class and comprising the standard number (2n) of points. For example, a covariance adjusted distance can be determined for each class between each point on the template and the corresponding point on the resampled trajectory. A linear combination of the distances can then be used as a total distance for the class. Alternatively, for each class, a covariance adjusted distance can be determined between a point in 2n-dimensional space representing the class template and a point representing the resampled trajectory. At 210, the smallest associated distance value is compared to a threshold value. If the smallest distance exceeds the threshold value, a null class is selected at 212. If the smallest distance does not exceed the threshold value, a class represented by the smallest distance value is selected and displayed to the user at 214.

Figure 6:
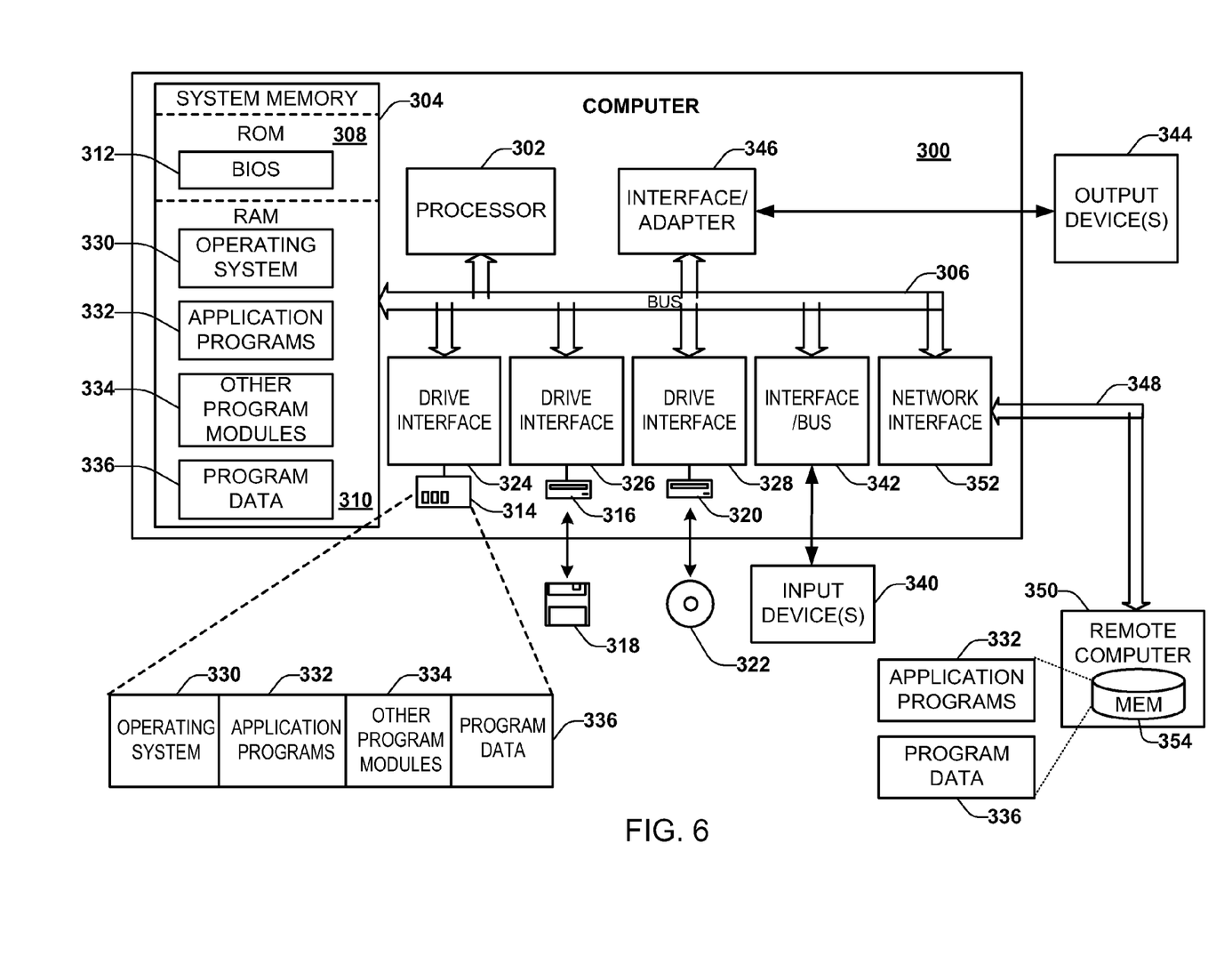
FIG. 6 illustrates a computer system that can be employed to implement systems and methods described herein, such as based on computer executable instructions running on the computer system.

FIG. 6 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336.

A user may enter commands and information into the computer system 300 through user input device 340, such as a keyboard, a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A non-transitory computer readable medium, storing executable instructions for recognizing a single stroke character, the executable instructions, comprising:
   a gesture input interface configured to convert input from a user into a trajectory representing a single stroke character;
   a normalization component configured to resample the trajectory to produce a resampled trajectory having a standard size;
   a reference point generator configured to define a standard number of substantially equidistant reference points on the resampled trajectory, each of the reference points having at least two associated coordinates;
   a plurality of class templates, each of the plurality of class templates representing an associated single stroke character class and comprising for each of a set of points corresponding to the standard number of points, a mean value for each of at least two coordinates corresponding to the at least two coordinates associated with the reference points, a variance value for each of the at least two coordinates, and a covariance between a first coordinate and a second coordinate of the at least two coordinates; and
   a covariance adjusted distance component configured to determine respective covariance adjusted distances between the mean values for the at least two coordinates of the set of points associated with each of the plurality of class templates and the reference points on the resampled trajectory.

2. The non-transitory computer readable medium of claim 1, the covariance adjusted distance component being configured to determine a distance for a given class template as the Mahalanobis distance between a first vector comprised of the at least two coordinates of each of the plurality of reference points and a second vector comprising the mean values of the at least two coordinates for each of the set of points comprising the class template.

3. The non-transitory computer readable medium of claim 1, the covariance adjusted distance component being configured to determine a distance for a given class template as a linear combination of respective covariance adjusted distances between each reference point and a corresponding point in the set of points associated with the class template.

4. The non-transitory computer readable medium of claim 1, the executable instructions further comprising a parameter calculation component configured to receive training data representing a single stroke character class, comprising reference points derived from user input at the gesture input interface, the normalization component, and the reference point generator, and calculate for each of the set of points associated with the class the mean value for each of the at least two coordinates, the variance value for each of the at least two coordinates, and the covariance between a first coordinate and a second coordinate.

5. The non-transitory computer readable medium of claim 1, the executable instructions further comprising a class selection component that selects a single stroke character class having a smallest associated covariance adjusted distance for its associated class template if the smallest associated covariance adjusted distance is less than a threshold value and selects a null class if the smallest covariance adjusted distance exceeds the threshold.

6. The non-transitory computer readable medium of claim 1, further comprising a display interface for communicating a character represented by a selected single stroke character class to an associated display.

7. A personal digital assistant, comprising:
   a processor operatively connected to the non-transitory computer readable medium of claim 6, such that the executable instructions stored on the computer readable medium are accessible by the processor; and
   a touch screen assembly configured to receive input from the user and to display the character represented by the selected single stroke character class.

8. A method for recognizing a single stroke gesture, comprising:
   receiving an input trajectory representing the single stroke gesture;
   normalizing the input trajectory to produce a normalized trajectory having a standard set of dimensions;
   reducing the normalized trajectory to a standard number of substantially evenly spaced points; and
   determining respective covariance adjusted distances for each class as the covariance adjusted position between a set of points representing each single stroke character classes and the substantially evenly spaced points representing the normalized trajectory.

9. The method of claim 8, further comprising selecting a single stroke character class associated with a smallest covariance adjusted distance if the smallest covariance adjusted distance value is smaller than a threshold value.

10. The method of claim 8, wherein receiving an input trajectory representing the single stroke gesture comprises tracking a movement of a stylus across a touch screen.

11. The method of claim 8, wherein receiving an input trajectory representing the single stroke gesture comprises tracking the movement of a user with at least one camera.

12. The method of claim 8, wherein determining a respective covariance adjusted distance for a given class of the plurality of classes comprises comparing a set of at least two coordinates representing each reference point to representative statistics for the set of points associated with the class.

13. The method of claim 12, wherein the representative statistics comprise, for each point in the set of points associated with the class, a mean value for a first coordinate, a mean value for a second coordinate, a variance for the first coordinate, a variance for the second coordinate, and a covariance between the first coordinate and the second coordinate across a set of training data associated with the class.

14. The method of claim 12, wherein the representative statistics comprise a vector that includes a plurality of parameters, the plurality of parameters comprising mean values for at least two coordinates associated with each point from the set of points associated with the class taken across a set of training data for the class, and a covariance matrix for the plurality of parameters.

15. The method of claim 12, further comprising:
acquiring a plurality of single stroke characters associated with the class;
normalizing each of the acquired input trajectories to produce a training set of normalized trajectories having the standard set of dimensions;
reducing each of the training set of normalized trajectories the standard number of substantially evenly spaced reference points, each having at least two coordinates, to provide a set of training data for the class;
calculating the representative statistics for the set of points associated with the class from the set of training data.

16. A single stroke character recognition system, comprising:
an input device is configured to convert a movement by one of a portion of a user's body and an object held by the user into a trajectory representing a single stroke character;
a non-transitory computer readable medium storing machine executable instructions, the machine executable instructions comprising:
a normalization component configured to resample the trajectory to produce a resampled trajectory having a standard size;
a reference point generator configured to define a standard number of substantially equidistant reference points on the resampled trajectory, each of the substantially equal points having at least two associated coordinates;
a plurality of class templates, each of the plurality of class templates representing an associated single stroke character class and comprising representative statistics for at least two coordinate values for each of a set of points corresponding to the standard number of points; and
a covariance adjusted distance component configured to determine respective covariance adjusted distances between the set of points associated with each of the plurality of class templates and the reference points on the resampled trajectory; and
a processor operatively connected to the non-transitory computer readable medium and configured to execute the machine executable instructions.

17. The system of claim 16, the covariance adjusted distance component being configured to determine a covariance adjusted distance for a given class template as the Mahalanobis distance between a first vector comprised of at least two coordinates of each of the plurality of reference points and a second vector comprising mean values of at least two coordinates for each of the set of points comprising the class template.

18. The system of claim 16, the covariance adjusted distance component being configured to determine a distance for a given class template as a linear combination of respective covariance adjusted distances between each reference point and a corresponding point in the set of points associated with the class template.

19. The system of claim 16, the input device comprising a camera configured to image a designated region in one of the infrared spectrum and the visible spectrum.

20. The system of claim 16, the input device comprising a computer mouse.

* * * * *